March 17, 1931.  D. C. SHERMAN  1,796,966
MOUNTING FOR SHEAVES
Filed Jan. 13, 1928
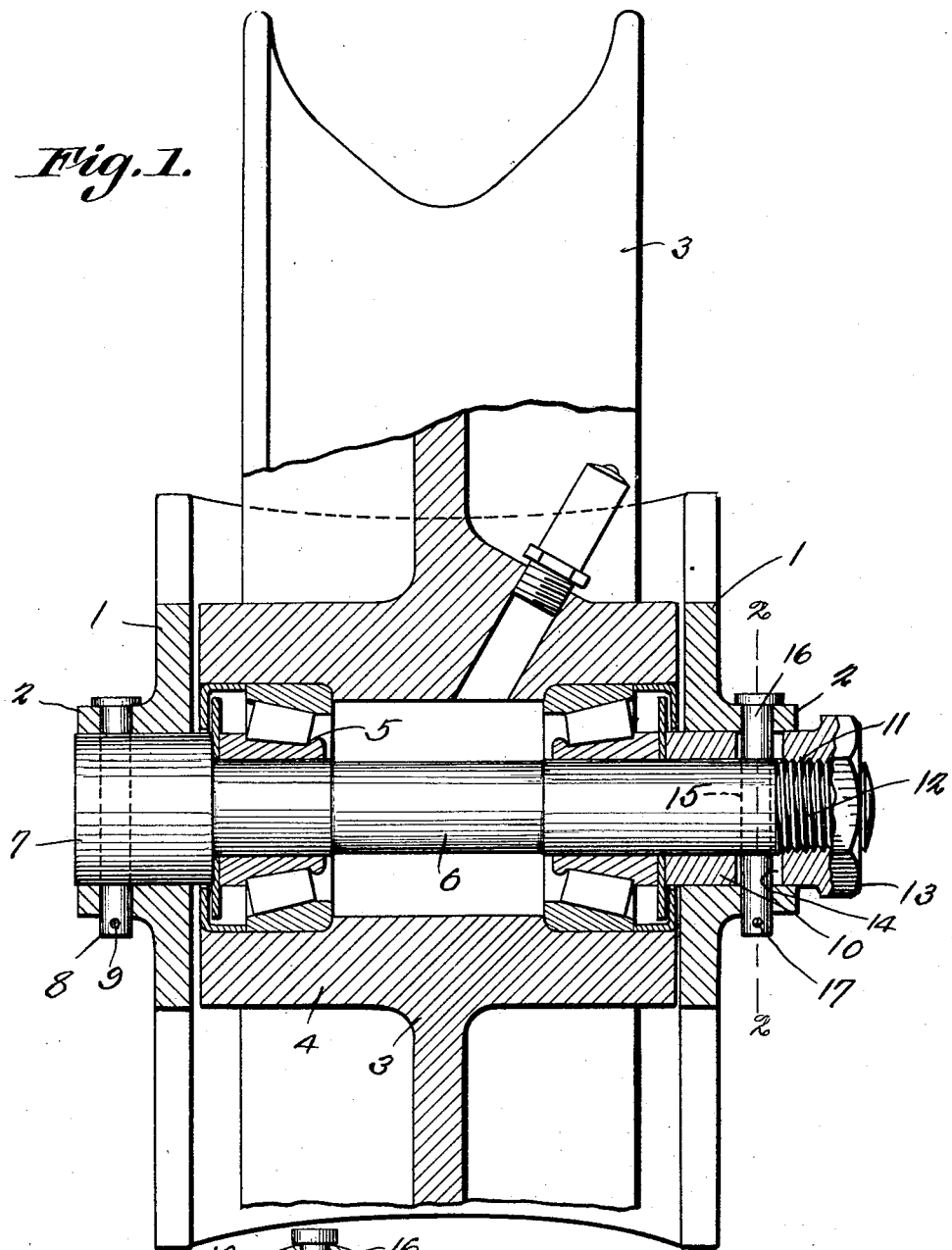
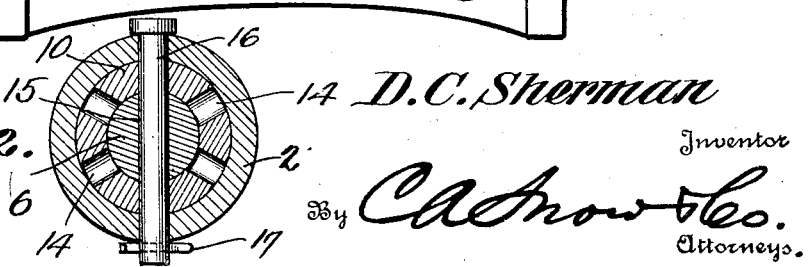
D. C. Sherman
Inventor Patented Mar. 17, 1931

1,796,966

UNITED STATES PATENT OFFICE

DELMAR CHARLES SHERMAN, OF CHATTANOOGA, TENNESSEE, ASSIGNOR TO WILLIAMSPORT WIRE ROPE COMPANY, A CORPORATION OF PENNSYLVANIA

MOUNTING FOR SHEAVES

Application filed January 13, 1928. Serial No. 246,514.

This invention relates to a mounting for use in connection with a sheave of an overhead carrier or the like.

In a carrier or truck of this type it is desirable to obtain the greatest possible rigidity for the side plates of the structure and rigid spacing means must be provided from these side plates at the axis of the sheave. In order to obtain this result it is essential that the sheave supporting shaft or spindle be secured to the side plates so as to be held against endwise movement in either direction. At the same time this spindle must be removable so that the sheave can be placed in and removed from position without disturbing the truck structure.

It is an object of the present invention to provide simple and efficient means whereby the desired results above stated can be secured, the structure being such as to compensate for wear in the bearings, inaccuracies in the machining of the parts may be offset and a correct endwise fit obtained on bearings of any type used in the sheave.

Another object is to provide a structure of this character which permits formation of the side members of the truck or carriage in one integral piece or allows these members to be attached together permanently at points beyond the periphery of the sheave, thereby rendering the device advantageous not only for use in connection with trucks and carriages such as used in overhead carriers but also for use in connection with blocks employed with wire ropes and the like.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 1 is a section through a portion of a sheave having the present improvements combined therewith.

Figure 2 is a section on line 2—2, Figure 1.

Referring to the figures by characters of reference 1 designates the side plates of the overhead carrier or truck, these plates being permanently connected at points beyond the periphery of the sheave therebetween or formed in one integral part. Each of the side plates has an outwardly extended boss 2. A portion of the sheave mounted between the plates has been indicated at 3, the hub portions 4 of this sheave being provided with any suitable bearings indicated generally at 5.

A sheave supporting shaft or spindle 6 is extended through the side plates 1 and has an enlargement or head 7 at one end fitting snugly in one of the bosses 2 and adapted to be held against rotation therein by a diametrical pin 8 which can be held in place by a cotter pin 9 as shown. This enlargement or head 7 constitutes an abutment for receiving end thrust from one of the bearings 5. The other bearing 5 is adapted to transmit its end thrust to a sleeve 10 which fits on the spindle 6 and is disposed snugly within the other boss 2. One end portion of the sleeve is interiorly screw threaded as at 11 for engagement with threads 12 on the spindle 6. A head 13 is provided at the outer end of the sleeve whereby, by the use of a suitable tool, such as a wrench, the sleeve can be rotated to tighten or loosen the parts. Formed in the sleeve are diametrical openings 14 any one of which is adapted to be brought into register with a diametrical opening 15 formed in the spindle 6. The openings 14 are in the form of short slots extending longitudinally of the sleeve as shown particularly in Figure 1. A pin 16 is insertable through the boss 2 into any one of the openings or slots 14 and through the opening 15 in the spindle 6. The locking pin 16 can be held in place by a cotter pin 17 or the like.

In practice the sheave with the bearings therein is inserted between the relatively fixed plates 1 of the carrier. Spindle 6 is then inserted transversely through the plates 1 until the head 7 is seated in one of the bosses 2 whereupon it is held by means of the pin. Spindle 6 will of course extend through the bearings 5. Thereafter the sleeve 10 is inserted into the other boss 2 and rotated so that the cooperating threads 11 and 12 will feed the sleeve inwardly until the parts have been tightened sufficiently. The sleeve is stopped with one of the slots or openings 14 and registers with the opening 15 after which the locking pin 15 is inserted through the registering opening. This will of course hold the sleeve against retrograde movement.

Obviously whenever it is desired to take up wear or otherwise adjust the parts it is merely necessary to remove the locking pin 16, turn the sleeve 10 to bring one of the slots 14 into register with the opening 15 and reinsert the locking pin. By providing the slots 14 instead of round openings, a slight longitudinal play of the sleeve is permitted.

It will be noted that with the arrangement described the side plates of the structure carrying the sheave can be made integral or can be permanently connected and they will at the same time be properly connected by the spindle 6 so that they cannot be deflected inwardly and bind on the sheave and interfere with its operation. Nor can these plates be bent outwardly and render the fastening means insecure.

Obviously by providing the connection described inaccuracies in machining may be compensated for.

This structure is formed of few parts, can be easily produced by ordinary machines and, consequently, is inexpensive to manufacture and has great inherent strength.

What is claimed is:

1. The combination with side plates of a structure, and a sheave mounted for rotation therebetween, said plates having laterally extended bosses, of a sheave supporting spindle insertable into the bosses, an enlargement at one end of the spindle for snug engagement with one of the bosses, a locking pin carried by said boss for engaging the enlargement to hold the spindle against movement relative to one of the plates, the other end of the spindle being screw threaded, an interiorly screw threaded adjusting sleeve engaging the threaded portion of the spindle and fitted snugly within the other boss, said sleeve and the enlargement cooperating to provide thrust bearings for the sheave, there being a plurality of elongated diameterical openings in the sleeve and a single diametrical opening in the spindle adjacent its threaded portion adapted to register with any one of the sleeve openings, and a locking pin insertable through one of the openings in the sleeve, the opening in the spindle and the adjacent boss thereby to hold the sleeve against rotation after adjustment and to hold the spindle against movement relative to said boss and its plate.

2. The combination with fixedly mounted side plates of a carrier, of a demountable sheave therebetween, a sheave supporting spindle mounted in the opposed side plates but removable therefrom, means at one end of the spindle constituting a thrust bearing for one side of the sheave, a sleeve in screw threaded engagement with the other end portion of the spindle constituting a thrust bearing for the other side of the sheave, and fastening pins removably mounted in portions of the side plates and extending through the respective end portions of the spindle for holding the same against movement relative to the side plates, there being a plurality of longitudinally extending diametrical openings in the sleeve any one of which is adapted to receive one of said fastening pins to hold the sleeve against rotation, said spindle and the fastening pins cooperating to maintain the side plates against movement toward or from each other.

In testimony that I claim the foregoing as my own, I have hereto affixed by signature.

DELMAR CHARLES SHERMAN.